(12) United States Patent
Frick

(10) Patent No.: US 8,701,130 B2
(45) Date of Patent: Apr. 15, 2014

(54) IMPLEMENTING REMOTE PROCEDURE CALLS

(75) Inventor: Lloyd K. Frick, Pepperell, MA (US)

(73) Assignee: Teradyne, Inc., North Reading, MA (US)

( * ) Notice: Subject to any disclaimer, the term of this patent is extended or adjusted under 35 U.S.C. 154(b) by 45 days.

(21) Appl. No.: 13/532,944

(22) Filed: Jun. 26, 2012

(65) Prior Publication Data

US 2013/0347010 A1    Dec. 26, 2013

(51) Int. Cl.
*G06F 13/00* (2006.01)
(52) U.S. Cl.
USPC .......................................................... 719/330
(58) Field of Classification Search
USPC .......................................................... 719/330
See application file for complete search history.

(56) References Cited

U.S. PATENT DOCUMENTS 6,108,715 A * 8/2000 Leach et al. .................. 719/330
7,624,398 B2 * 11/2009 Wang et al. ................... 719/315

* cited by examiner

*Primary Examiner* — Andy Ho
(74) *Attorney, Agent, or Firm* — Fish & Richardson P.C.

(57) ABSTRACT

A first computing device is programmed to perform operations (i) to collect parameter data for use by a remote function, and (ii) to pass information, including the parameter data, to a second computing device. The second computing device is programmed to perform operations (i) to build a stack based on the parameter data, (ii) to use the information to locate code for the function on the second computing device, (iii) to execute the code for the function on the second computing device, where the function uses the parameter data on the stack, (iv) to obtain output values from execution of the code for the function, and (v) to pass parameter data, including the output values, to the first computing device.

25 Claims, 5 Drawing Sheets

IMPLEMENTING REMOTE PROCEDURE CALLS

TECHNICAL FIELD

This disclosure relates generally to implementing remote procedure calls.

BACKGROUND

Automatic test equipment (ATE) plays a role in the manufacture of electronics, such as semiconductor devices and circuit board assemblies. Manufacturers generally use automatic test equipment, or "test instruments", to verify the operation of devices during the manufacturing process. Such devices are referred to as a "device under test" (DUT) or a "unit under test" (UUT). Early detection of faults eliminates costs that would otherwise be incurred by processing defective devices, and thus reduces the overall costs of manufacturing. Manufacturers also use ATE to grade various specifications. Devices can be tested and binned according to different levels of performance in areas, such as speed. Devices can be labeled and sold according to their actual levels of performance.

SUMMARY

Described herein are example systems for implementing remote procedure calls. An example of such a system is a test system that includes a first computing device programmed to execute a test routine, where the test routine is written to call a remote function; and a second computing device programmed to execute the remote function. The first computing device is programmed to perform operations (i) to collect parameter data for use by the remote function, and (ii) to pass information, including the parameter data, to the second computing device. The second computing device is programmed to perform operations (i) to build a stack based on the parameter data, (ii) to use the information to locate code for the function on the second computing device, (iii) to execute the code for the function on the second computing device, where the function uses the parameter data on the stack, (iv) to obtain output values from execution of the code for the function, and (v) to pass parameter data, including the output values, to the first computing device. At least some of the operations performed by the first computing device and the second computing device are implemented using a programming language that does not support type introspection. The example test system may include one or more of the following features, either alone or in combination.

Passing the information from the first computing device and passing the parameter data from the second computing device may be part of a marshaling convention. The first computing device and the second computing device may be programmed to recreate the marshaling convention for subsequent calls to the remote function from the first computing device.

On the second computing device, the following operations may be implemented using a first computing language: (i) to build a stack based on the parameter data, and (iii) to execute the code for the function on the second computing device. On the second computing device, the following operations may be programmed using a second computing language: (iv) to obtain output values from execution of the code for the function, and (v) to pass parameter data, including the output values, to the first computing device. The first computing language may be Assembly language and the second computing language may be the C computing language. In this example implementation, the second computing language does not support type introspection.

The information may comprise a module identifier for identifying the second communication device and a function identifier for identifying the remote function. The module identifier and the function identifier may be usable to obtain a physical address in which the code for the remote function is located. Using the information to locate executable code for the function on the second computing device may comprise resolving the physical address using the module identifier and the function identifier, and retrieving the executable code for the function.

The first computing device may be programmed to write data to registers on the second computing device. The second computing device may be programmed to identify the data in the registers and to react to the data in the registers by locating the code for the function on the second computing device and by executing the code. The first computing device may be programmed to receive the parameter data, to identify locations where to store return values in the parameter data, and to store the return values in the locations.

The system may further comprise at least one PCI bus on a path between the first computing device and the second computing device.

Collecting the parameter data may comprise identifying, in a parameter list, one or more parameter types, one or more corresponding parameter values, and an end-of-list indicator. The first computing device may be a client device and the second computing device may be a server device.

Two or more of the features described in this disclosure, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference numerals indicate like elements.

DETAILED DESCRIPTION

Figure 1:
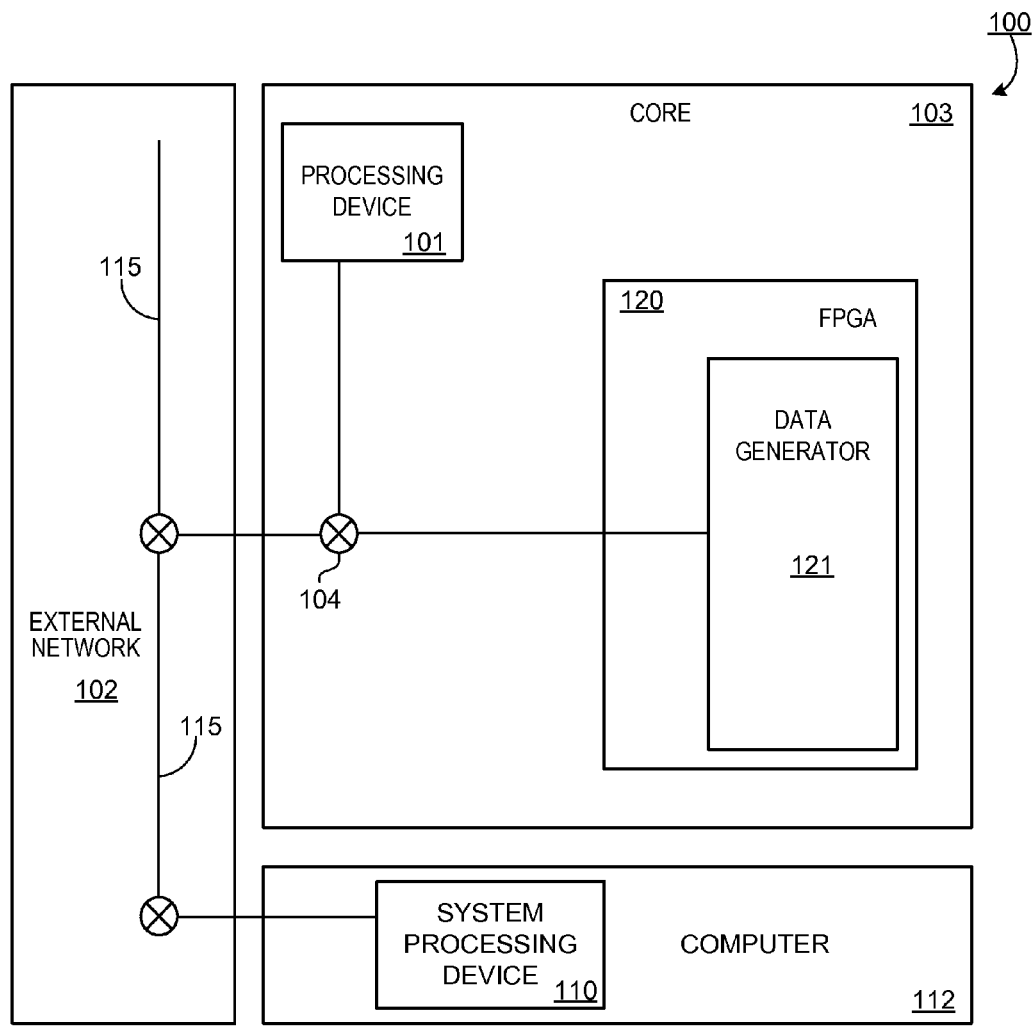
FIG. 1 is an example block diagram of a test instrument.

In an example implementation, a test instrument/system includes computers (e.g., clients) and embedded processors (e.g., servers), either of which can execute test application software (e.g., a test routine). In such a test instrument, a remote procedure call (RPC) is a function call initiated from a client that is executed on a server. As described in wikipedia.org, "[i]n computer science, [an RPC] is an inter-process communication that allows a computer program to cause a subroutine or procedure to execute in another address space (commonly on another computer on a shared network) without the programmer explicitly coding the details for this remote interaction. That is, the programmer writes essentially the same [source] code whether the subroutine is local to the executing program, or remote." In this regard, source code is usually written by humans in languages like C and Assembly. Source code can also be generated by tools, such as the source code generation tool described herein. A compiler translates source code into executable code. Executable code is read and executed by a computer's CPU.

Operations to implement an RPC may include, but are not limited to: (i) collecting RPC parameter values on the client, (ii) conveying the RPC parameter values from client to server, (iii) executing the remote function on the server, (iv) collecting output parameter values and return values on the server, and (v) conveying the output parameter values and return value from server to client.

In this example, in the collection and conveying operations (collectively referred to herein as "marshaling"), RPC logic (e.g., the hardware and/or software on the test instrument used to implement RPCs) is told, or learns about, the number and types of output parameters and return values. The test system described herein includes a customer-facing application programming interface (API) to the RPC logic to obtain the marshaling information for an RPC.

There are two common approaches to RPC—one based on type introspection and one based on source code generation. Generally, type introspection is the ability of a program to determine the type or properties of a function at runtime. In this context, the function is a remote function. In some examples, a remote function can be a function that is not executing on the same machine or network as the program from which it is called. In other examples, a remote function may execute on the same machine or network as the program from which it is called, but the remote function is not fully integrated with the calling program and, therefore, is handled according to the processes described herein.

When an application developer programs in a computing language that supports type introspection (e.g., C#-"C sharp"), generic RPC logic can use type introspection to automatically learn about a function's parameter and return type information. Armed with this information, the RPC logic can then automatically gather the values to be conveyed to the other device (e.g., to a server). Typical implementations of this type automatically handle the five operations outlined above. Notably, this includes the actual call to the remote function. This may require the RPC logic to dynamically construct a call to the remote function on the server if the server-side RPC logic was compiled separately from the target function.

By contrast, when an application developer programs in a computing language that does not support type introspection (e.g., C), non-custom RPC solutions heretofore have utilized some form of source code generation. At development-time, the application developer supplies a description of the remote functions' type information to a source code generation tool. That tool generates two sets of source code—one that the application developer compiles into their client-side program and one to be compiled into their server-side program. These two sets of generated source code implement logic that corresponds to operations (i), (iii) and (iv) above (namely, (i) collecting input parameter values on the client, (iii) executing the remote function on the server, and (iv) collecting output parameter values and return values on the server). The application developer connects these two sets of generated code to other source code that addresses operations (ii) and (v) above (namely, (ii) conveying the input parameter values from client to server, and (v) conveying the output parameter values and return value from server to client).

In some examples, the processes described herein allow an application developer to program a test routine in a language that does not support type introspection (e.g., C), yet employ RPCs in the test routine without requiring source code generation, such as that described above, and its associated source code generation tool. In an example, the test routine constructs a description of marshaling information at runtime and passes that description to the test instrument RPC logic on the client. The RPC logic implementation is part of an architecture comprised of complementary software modules resident on the client and the server that handles communication between the client and the server. Accordingly, the processes allow executable code in the test instrument that implements the RPC logic noted above (e.g., the instrument's runtime software) to take this marshaling information and to implement RPC operations automatically (e.g., without subsequent manual or external programmatic intervention).

In an example implementation a test instrument that implements the foregoing processes includes multiple computing devices (e.g., clients and servers, as described above). Each of the computing devices may be a computer, an embedded processing device, programmable logic (e.g., a field programmable gate array—FPGA), an application-specific integrated circuit (ASIC), or any combination thereof. In an example implementation, a first of the computing devices is programmed to execute a test routine, e.g., to test a UUT. The test routine may be run, e.g., on a computer and call a remote function run by a computing device embedded in a test instrument core (as described below, a test instrument may contain multiple cores). This calling of a remote function by the test routine is a type of RPC. In this example, the test routine may be provided by a third party, such as a customer, who does not have control over executable code on the test instrument (e.g., the instrument's runtime software).

In this example, the processing device embedded in the test instrument core is an example of a server, which is programmed to execute the remote function in response to an RPC from a client (e.g., the first computing device). In performing the RPC, the client is programmed to (i) to collect parameter data for use by the remote function, and (ii) to pass information, including the parameter data, to the server (a second computing device). For example, the parameter data may include values and types of parameters that are used to execute the remote function, and the information may include identifiers that may be used by the server to resolve the physical address of the remote function on the server or elsewhere.

In this example, the sever is programmed (i) to build a stack based on the parameter data, (ii) to use the information from the client to locate executable code for the function on the second computing device, (iii) to execute the code for the function on the second computing device, where the function uses the parameter data on the stack during execution, (iv) to obtain output values from execution of the function, (v) to incorporate the output values into the parameter data, and (vi) to pass parameter data, including the output values, back to the client (first computing device). The client receives the parameter data, which may include return values, and stores the return values at specified locations, e.g., on the client. The test routine may retrieve parameter data from the remote function from these specified locations.

In the foregoing example, as noted above, the client and the server are each programmed with complementary software modules (e.g., computer programs or portions thereof). These modules are configured to implement a marshaling convention, by which parameters, values, and other information can be conveyed between computing devices. In this context, "marshaling" is a term that refers to passing data in a generic sense, including from one machine to another, as is done in an RPC. The test routine, in the above example, is not typically aware of the marshaling convention, nor need it be provisioned by the same entity that programmed the computing devices. For example, the computing devices may be equipped with computer programs provided by the test instrument manufacturer, whereas the test routine may be created by, and provided by, a customer that is using the test instrument to perform testing operations on its UUTs. The RPC process described herein may be advantageous in scenarios such as this, where the test routine and test instrument programs are not fully integrated, thereby preventing the test routine from calling a remote function directly.

The RPC processes described herein, and variations thereof, may be implemented on any appropriate system, with any appropriate computing devices and computing equipment. Examples elements of such a system (here, a test instrument) are described below with respect to FIGS. 1 to 5. Other systems, however, may be used to implement the RPC processes described herein.

FIG. 1 is a block diagram of an example implementation of a test instrument 100 (also referred to as ATE) that may be used to implement the RPC processes described herein. In FIG. 1, test instrument 100 includes a processing device 101.

In this example, processing device 101 controls various features of test instrument 100, such as communication with an external network 102, which may be a PCI (Peripheral Component Interconnect) Express network. In addition, processing device 101 is programmable to perform various testing operations, as described below. Processing device 101 may be a microprocessor, microcontroller, programmable logic, or other appropriate circuitry for performing processing operations. In some examples, processing device 101 may include one or more processing devices, such as one or more microprocessors or a single multi-core microprocessor (not shown). Processing device 101 may also include memory (not shown) that stores executable code to control test instrument communication with the external environment, and to perform various "housekeeping" functions to control operation of test instrument 100. For example, processing device may be responsible for exchanging communications between the test instrument and one or more external entities over an output interface, such as a network interface, scanning the test instrument for malware, memory management, power control, and other functions that are not specifically related to testing a device.

Processing device 101 is programmable to perform test operations on a UUT (not shown) interfaced to test instrument 100, e.g., via network 102. The test operations may include, but are not limited to, testing bus speed, reaction time, or any other appropriate operational aspects of the UUT. In general, the testing that is performed is dependent upon the type of device being tested, and the information sought during testing. In this regard, one or more test programs (which implement corresponding test routines) may be loaded into memory on processing device 101, and executed by processing device 101 in order to perform testing.

The test programs may include one or more functions for performing testing operations directly on an interfaced UUT. These functions may be accessible through an RPC initiated, e.g., by system processing device 110 (described below) or another computing device, such as a personal computer (not shown), communicatively connected to the test instrument, e.g., through external network 102 or through another communications medium. While performing testing, processing device 101 may continue to perform other functions, including those described elsewhere herein, e.g., to keep test instrument 100 operational. Consequently, the test latency (e.g., the amount of time between the start of a test and receipt of test results) can be maintained. In different systems, numerous factors may have an effect on test latency, such as the speed of the processing device(s), the amount of memory available to run the test programs, and so forth.

In the examples described herein, processing device 101 is part of a multi-tiered processing system. For example, the first tier may include a system processing device 110. System processing device 110 may include a microprocessor, microcontroller, programmable logic, or other appropriate circuitry for performing processing operations. In some examples, system processing device 110 may include one or more processing devices, such as one or more microprocessors or a single multi-core microprocessor (not shown). System Processing device 110 may also include memory (not shown) that stores executable code that is executed to perform functions, such as those described herein.

In this regard, system processing device 110 may be configured to perform testing operations, such as those described herein, on individual UUTs. System processing device 110 may also be configured to coordinate processing among various test instruments, including test instrument 100. System processing device 110 may be separate from, or incorporated into, a test instrument. In FIG. 1, system processing device 110 is part of computer 112 (e.g., a personal computer), although that need not be the case in other system implementations. In the example described herein, system processing device 110 is the client and is programmed to (i) to collect parameter data for use by a remote function, and (ii) to pass information, including the parameter data, to processing device 101.

A second tier in the multi-tiered system may include embedded processing devices, such as processing device 101. Such processing devices are embedded in the sense that they are incorporated into cores of test instrument 100, and may be dedicated to performing test functions (e.g., to testing UUTs interfaced to test instrument 100). Generally, a core may be hardware (e.g., a test board) configured to perform testing relatively independently on a UUT or set of UUTs. So, in an example, one core can test a first set of UUTs, a second core can test a second set of UUTs, and so forth. A computing device, such as system processor 110 may coordinate testing and other operations among various cores.

In this regard, FIG. 1 shows only one core 103 of the test instrument; however multiple cores identical to core 103 may be included in the same test instrument. Embedded processing devices need not (but may) be responsible for test instrument operations. In some implementations, the embedded processing devices may be programmed to perform one or more such operations, or other operations not specifically directed to testing UUTs. In the examples described herein, embedded processing device 101 is programmed to execute a remote function in response to an RPC (e.g., from system processing device 110 or from another computing device). In this example, embedded processing device 101 acts as a server in the RPC process, and is programmed to (i) to build a stack based on parameter data received as part of the RPC, (ii) to use information received as part of the RPC to locate code for the function, (iii) to execute the code for the function, where the function uses the parameter data on the stack during execution to produce output values, (iv) to obtain the output values from execution of the code for function, (v) to incorporate the output values into the parameter data, and (vi) to pass parameter data, including the output values, to the client, e.g., system processing device 110.

The third tier may include programmable logic, e.g., field-programmable gate arrays (FPGAs) (not shown), each of which may be configured to act as an interface between a UUT, or portion thereof (e.g., a UUT bus) and test instrument 100, and to facilitate testing. In some implementations, the FPGAs, or other logic, may also be programmed to perform test operations on UUTs. In some implementations, the FPGAs may act as a server in the RPC process. Likewise, in some implementations, an embedded processor may act as a client.

In some implementations, testing may be performed by different tiers of the architecture concurrently or in concert (e.g., coordinated among the tiers). For example, programs run on processing device 101, which may or may not be part of distinct test programs, may service RPCs (e.g., from system processing device 110) in the manner described herein. In another example, two or more of system processing device 110, embedded processing devices 101, and FPGA(s) (not shown) may act in coordination, at the same time or within the same test sequence, to perform one or more test operations on a single UUT or on multiple UUTs. To effect such coordination, appropriate programming is loaded into processing devices 101 and/or 110, and/or appropriate images are loaded into the FPGA(s). By way of example, a first test may be performed on a UUT by system processing device 110; a second test may be performed on the UUT by processing device 101; and a third test may be performed on the UUT by an FPGA (not shown). The first, second and third tests may be separate tests, or part of the same test sequence. Data from the first, second and third tests may be combined, e.g., in system processing device 110, and processed to obtain the appropriate test results. These test results may be sent to an external computer for analysis and reporting.

In some implementations, testing may be performed exclusively by one tier or another of the architecture. For example, processing device 101 may be programmed to run one or more test programs to test a UUT, while devices on other tiers of the architecture do not perform UUT tests. System processing device 110 may be programmed to run one or more test programs to test a UUT, while devices on other tiers of the architecture do not perform UUT tests. FPGAs may be configured to run one or more tests on the device, while devices on other tiers of the architecture do not perform UUT tests. Devices that are not performing tests are not necessarily dormant during this time. For example, system processing device 110 may continue to coordinate operations among various cores of the test instrument and/or other test instrument electronics; the FPGAs may continue to route data to/from the UUT (i.e., to act as interfaces to the UUT); and the embedded processing devices may continue be active in coordination or other communication (e.g., transmitting test results from the FPGAs to system processing device 110).

In FIG. 1, network 102 may have a PCI Express bus backbone 115, although other bus architectures may be used. Generally, a PCI Express bus is a high-speed serial interconnect bus that uses shared address/data lines. PCI Express is based on point-to-point topology, with separate serial links connecting devices to a root complex (e.g., processing device 101 for core 103). PCI Express communication is encapsulated in packets. Conventionally, in the PCI Express protocol, message signal interrupts (MSI) are sent from individual hardware elements to the root complex (e.g., processing device 101 in core 103).

In the example system described herein, embedded processing device 101 may be configured to receive interrupts (e.g., MSIs) from multiple various hardware devices on test instrument 100, including system processing device 101.

Test instrument 100 also includes electronic circuitry, e.g., programmable logic such as FPGA 120, that acts as an aggregator to aggregate (e.g., combine) and output information about interrupts. FPGA 120 is configured, among other things, to receive interrupts bound for a processing device (e.g., processing device 101), where the interrupts are received from one or more devices that are configured to communicate with the processing device, to generate data containing information corresponding to the interrupts, and to send the data to the processing device. In some implementations, FPGA 120 is programmed to implement a data generator 121 to perform the operations of generating data containing information corresponding to the interrupts, and sending the data to the processing device.

Figure 2:
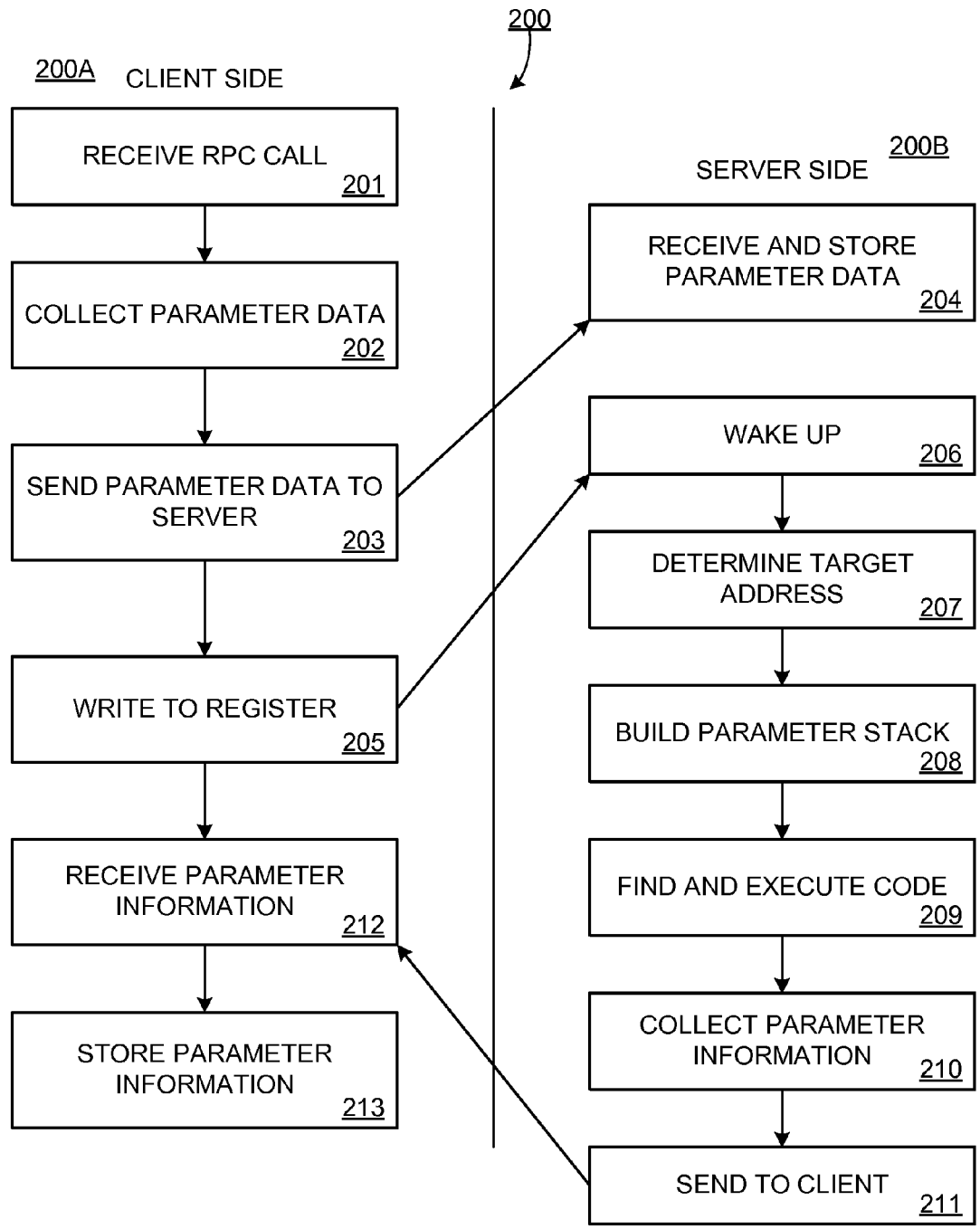
FIG. 2 is a flowchart of an example process that may be performed by the test instrument of FIG. 1 for implementing remote procedure calls.

FIG. 2 is a flow chart showing an example process 200 for implementing RPCs in the manner described above. Process 200 may be performed, e.g., on the test system shown in FIGS. 1 and 3 to 5 or an any appropriate hardware. In this example, test system includes a client side 200A, which may be implemented at least in part by system processing device 110, and a server side 200B, which may be implemented at least in part by embedded processing device 101.

Figure 3:
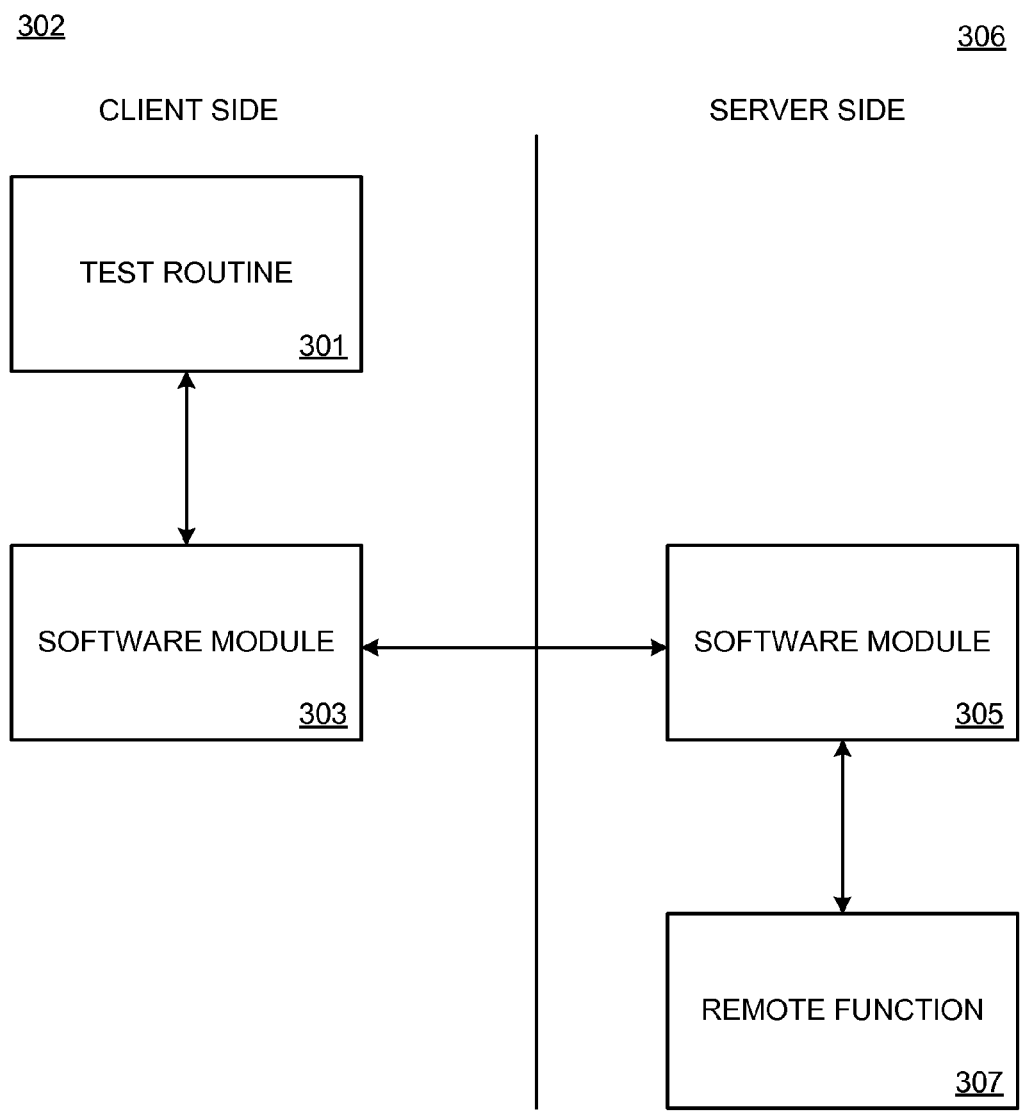
FIG. 3 is an example block diagram of software on a client and server for implementing remote procedure calls.

As noted above, the RPC logic implementation is part of a software architecture comprised of complementary software modules resident on the client and the server that handle communication between the client and the server. This is depicted, conceptually, in FIG. 3. Specifically, FIG. 3 shows a test routine 301 running on client side 302. Test routine 301 may be run, e.g., by a third party, who is not a purveyor of the test system. Client side 302 also includes a software module 303, which is configured to communicate with a counterpart software module 305 on server side 306. Software modules 303 and 305 implement the client side and server side operations, respectively, in this example implementation. Server side 306 also includes a remote function 307. In example process 200, remote function 307 is called by test routine 301 using an RCP. Software modules 303 and 305 perform the processes described herein to enable the RPC. In an example implementation, software modules 303 and 305 are written wholly or partly in a programming language that does not support type introspection. Certain functionality of software module 305 is written in Assembly language; however, this need not be the case in all implementations. That functionality is identified below.

Referring back to FIG. 2, module 303 receives (201) an RPC from test routine 301. Module 303 collects (202) parameter data from the call. In an implementation, module 303 identifies the types and values of the parameters in the RPC call from test routine 301. The type and value of a parameter is known as the parameter's prototype. For example, the parameter types may be real or integer, and may vary in terms of numbers of bits, e.g., a 32-bit integer, a 16-bit real number, and so forth. Module 303 examines a parameter list in the RPC call to identify an end-of-list indicator (e.g., a "null" variable). The end-of-list indicator identifies the point where the parameter list for the current RPC ends. Module 303 determines the types and numbers of parameters by parsing data in the RPC call that precedes the end-of-list indicator.

The parameters may include return parameters, which are to contain values returned from the remote function following its execution.

Module 303 sends (203) the collected parameters, along with other information, from the client to the server. The other information may include a function identifier (ID) and a module ID. The module ID identifies the software module containing the called function, and the function ID identifies the function itself. This information is used by the server, as described below, to identify the physical address of executable code for the called remote function on the server.

Module 305 receives (204) the information from module 303, including the collected parameters, the module ID and the function ID. This information is stored in a location in memory on server side 202. Module 305 waits for an instruction to implement execution of the RPC. In this implementation, module 303 writes (205) to one or more registers (not shown) on the server. Module 305 monitors the content of the register(s) and, upon identifying appropriate data in the register(s), begins the process for executing the RPC. When that data is present, module 305 wakes (206) and determines (207) the target address of the function that is the subject of the RPC from test routine 201. In this implementation, module 305 determines the physical address of the remote function using the module ID and the function ID.

Module 305 builds (208) a parameter stack using the collected parameters. The parameter stack is a data structure from which the remote function retrieves the parameters and their values during its execution. Module 305 finds the code for the remote function at the target address, and executes that code (209). In this implementation, modules 303 and 305 are implemented using the C programming language. However, operations to build (208) the parameter stack and executing (209) the code for the remote function are implemented in Assembly language. In some implementations, only these modules are written in Assembly language. In other implementations, other modules may also be written in Assembly language. Other programming languages, including those that do not support type introspection, may be used to implement modules 303 and 305.

Following execution, remote function 307 outputs parameters and corresponding values. The parameters and output values may be output data produced as a result of function execution. Module 305 collects (210) this parameter information, and sends (211) that parameter information to module 303. Module 303 receives (212) the parameter information (e.g., the parameters and their values) and stores (213) that information at appropriate locations in memory. Test routine 301 may retrieve the information by reading from those locations.

The attached Appendix shows an example of an "RPC_execute" function, and the information contained therein that is passed between modules 303 and 305. The RPC_execute is an example of a function used in implementing the RPC processes described herein.

Figure 4:
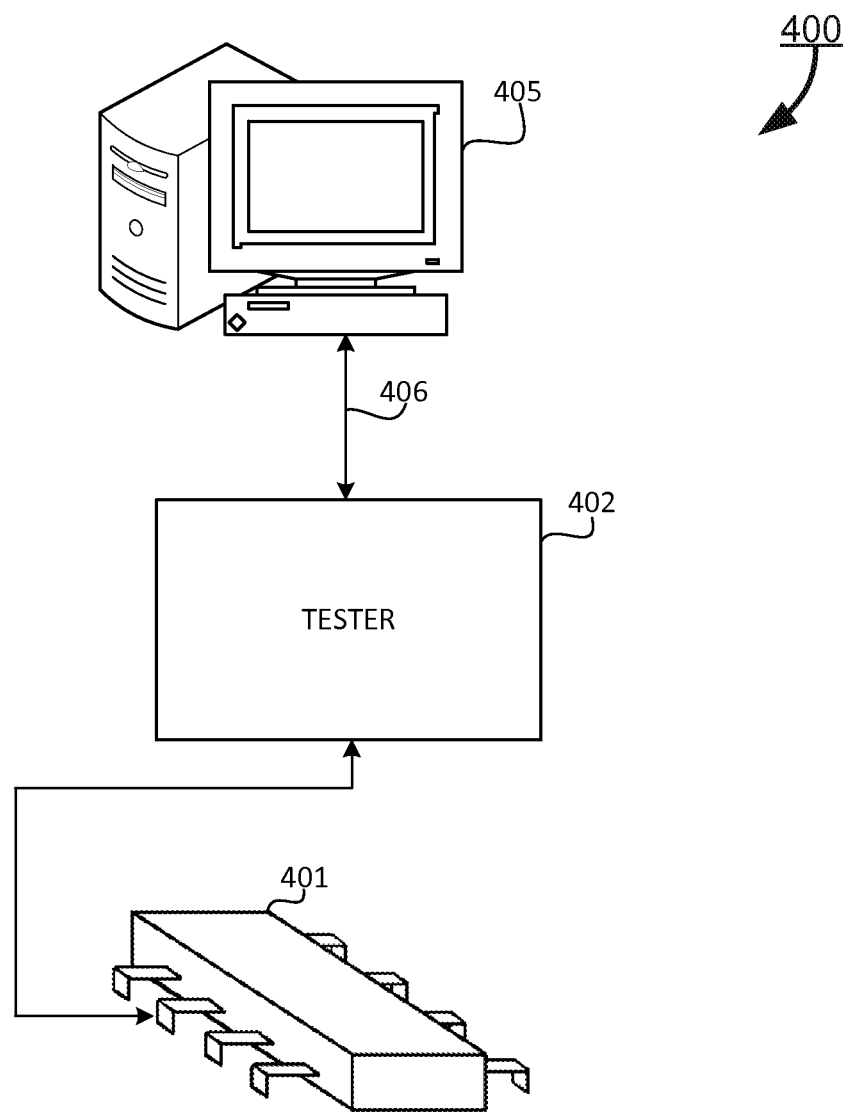
FIG. 4 is a block diagram of an example test system that may include the test instrument of FIG. 1, or portions thereof.

Referring now to FIG. 4, that figure shows an example of a test system on which the architecture of FIG. 1 may be implemented. Specifically, FIG. 4 shows an example test system 400 for testing a UUT 401. The test system of FIG. 4 may include test instrument 100 or portion(s) thereof. Test system 400 includes a tester 402, which may have the multi-tiered architecture of FIG. 1. To interact with tester 402, system 400 includes a computer system 405 that interfaces with tester 402 over a network connection 406. As noted below, computer system 405 may incorporate the functionality of computer 112 (FIG. 1) or it may be an external computer that interacts with computer 112 on the test instrument. Typically, computer system 405 sends commands to tester 402 to initiate execution of routines and programs for testing UUT 401. Such executing test programs may initiate the generation and transmission of test signals to the UUT 401 and collect responses from the UUT. Various types of UUTs may be tested by system 400. For example, UUTs may be avionics, radar, weaponry, semiconductor devices, and so forth.

To provide test signals and collect responses from the UUT, tester 402 is connected, via an appropriate FPGA interface, to one or more connector pins that provide an interface for the internal circuitry of UUT 401. For illustrative purposes, in this example, device tester 402 is connected to a connector pin of UUT 401 via a hardwire connection to deliver test signals (to the internal circuitry of UUT 401). Tester 402 also senses signals at UUT 401 in response to the test signals provided by device tester 402. For example, a voltage signal or a current signal may be sensed at a UUT pin in response to a test signal. Such single port tests may also be performed on other pins included in UUT 401. For example, tester 402 may provide test signals to other pins and collect associated signals reflected back over conductors (that deliver the provided signals). In some examples, by collecting the reflected signals, the input impedance of the pins may be characterized along with other single port testing quantities. In other test scenarios, a digital signal may be sent to UUT 401 for storage on UUT 401. Once stored, UUT 401 may be accessed to retrieve and send the stored digital value to tester 402. The retrieved digital value may then be identified to determine if the proper value was stored on UUT 401.

Along with performing one-port measurements, a two-port test may also be performed by device tester 402. For example, a test signal may be injected to a pin on UUT 401 and a response signal may be collected from one or more other pins of UUT 401. This response signal is provided to device tester 402 to determine quantities, such as gain response, phase response, and other throughput measurement quantities.

Figure 5:
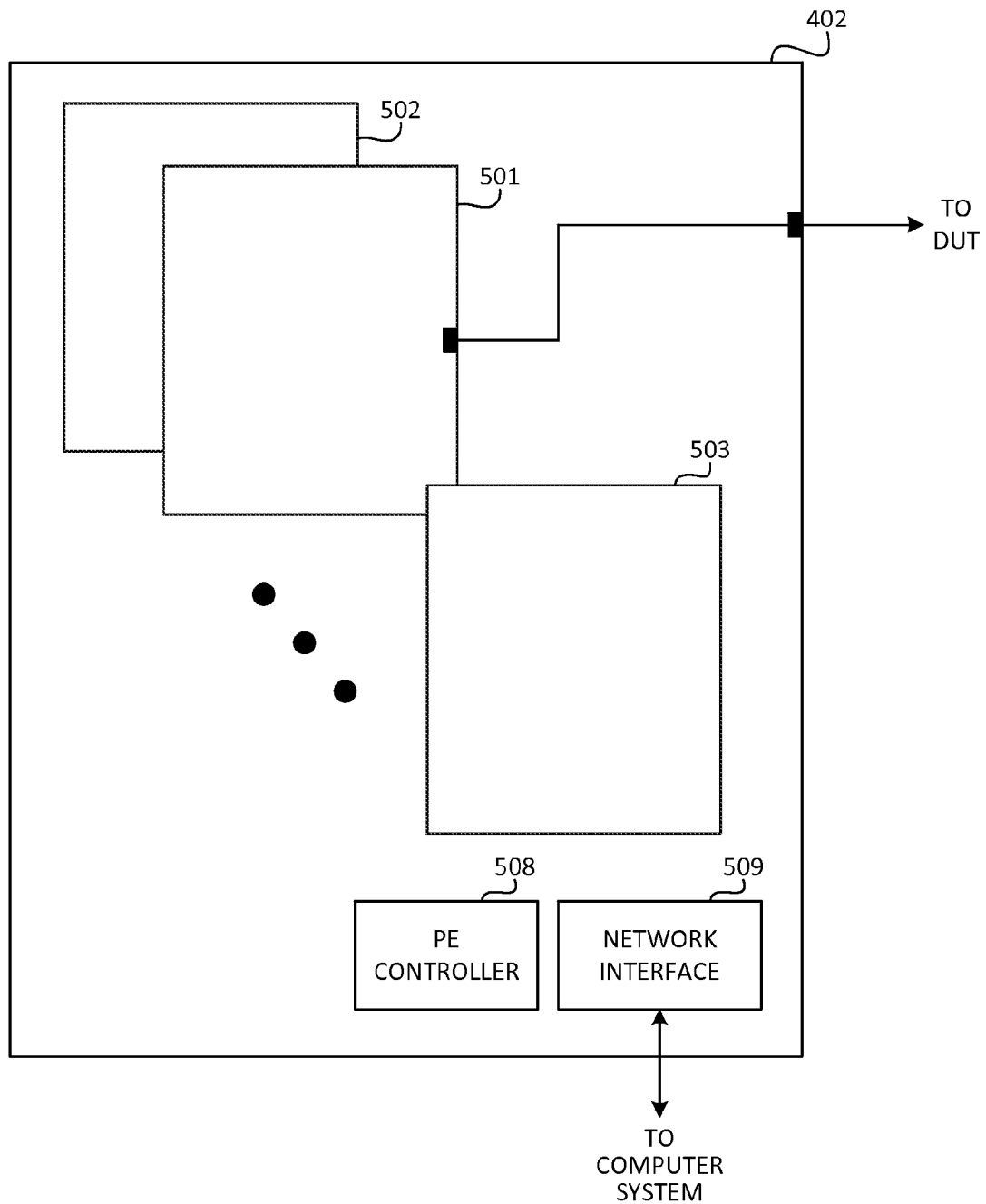
FIG. 5 is a block diagram of a portion of the test system of FIG. 4.

Referring also to FIG. 5, to send and collect test signals from multiple connector pins of a UUT (or multiple UUTs), device tester 402 includes an interface card 501 that can communicate with numerous pins. For example, interface card 501 includes the one or more cores (e.g., root complexes) described herein, which may be used to transmit test signals to the UUT and to collect corresponding responses. Each communication link to a pin on the UUT may constitute a channel and, by providing test signals to a large number of channels, testing time may be reduced since multiple tests may be performed simultaneously. Along with having many channels on an interface card, by including multiple interface cards in tester 402, the overall number of channels increases, thereby further reducing testing time. In this example, two additional interface cards 502 and 503 are shown to demonstrate that multiple interface cards may populate tester 402.

Each interface card may include dedicated integrated circuit circuitry, including, e.g., an FGPA and embedded processing device (as described, e.g., FIG. 1), for performing particular test functions. This circuitry may implement, e.g. a pin electronics (PE) stage for performing PE tests, and a parametric measurement unit (PMU) stage for performing tests. Typically PMU testing involves providing a (programmable) DC voltage or current signal to the UUT to determine such quantities as input and output impedance, current leakage, and other types of DC performance characterizations. PE testing involves sending DC or AC test signals, or waveforms, to a UUT (e.g., UUT 401) and collecting responses to further characterize the performance of the UUT. For example, the PE stage may transmit (to the UUT) AC test signals that represent a vector of binary values for storage on the UUT.

Once these binary values have been stored, the UUT may be accessed by tester 402 to determine if the correct binary values have been stored.

In some arrangements, an interface device may be used to connect one or more conductors from tester 402 to the UUT. For example, the UUT may connect to an Interface Test Adapter (ITA) which interfaces with an Interface Connection Adapter (ICA) that connects with the tester. The UUT (e.g., UUT 401) may be mounted onto a device interface board (DIB) for providing access to each UUT pin. In such an arrangement, a UUT conductor may be connected to the DIB for placing test signals on the appropriate pin(s) of the UUT. Additionally, in some arrangements, tester 402 may connect to two or more DIBs for interfacing the channels provided by interface cards 501 to 503 to one or multiple UUTs.

To initiate and control the testing performed by interface cards 501 to 503, tester 402 includes a PE controller 508 (e.g., in a system processing device, in an embedded processing device, or in programmable logic) to provide test parameters (e.g., test signal voltage level, test signal current level, digital values, etc.) for producing test signals and analyzing UUT responses. Tester 402 also includes a network interface 509 that allows computer system 405 to control the operations executed by tester 402 and also allows data (e.g., test parameters, UUT responses, etc.) to pass between tester 402 and to computer system 405.

The computer system, or another processing device used on or associated with test system 400, may be configured to exchange communications with a test program running on tester 402 through active communication channels with the device tester. The computer system may be, or include, computer 102 of FIG. 1. Alternatively, computer 102 may be part of tester 402 and the computer system described with respect to FIG. 5 may communicate with computer 102.

Testing, including those described herein, may be performed using a system processing device, embedded processing devices, or programmable logic. However, testing may be performed using a combination of system processing device, embedded processing devices, or programmable logic. For example, each of these different elements may run on or more test programs simultaneously to test the same device or portion thereof. Likewise, these different elements may coordinate testing so that, e.g., a system processing device performs a first part of a test sequence, an embedded processing device performs a second part of the same testing sequence, and programmable logic performs a third part of the same testing sequence. Any appropriate coordination may take place between the different programmable elements of the test instrument described herein.

In some implementations, a system processing device may be external to the test instrument. For example, an external computer may be employed to control operations of the test instrument, and may interact with embedded processing device(s) and programmable logic on the test instrument in the manner described herein. In other implementations, the system processing device may be part of the test instrument or remote from the test instrument (e.g., connected to the test instrument over a network).

In some implementations, programmable logic may be replaced with non-programmable logic. For example, rather than using an FPGA, one or more application-specific integrated circuits (ASICs) may be incorporated into the test instrument in place of, or in addition to, programmable logic.

The functionality described herein, or portions thereof, and its various modifications (hereinafter "the functions"), are not limited to the hardware described herein. All or part of the functions can be implemented, at least in part, via a computer program product, e.g., a computer program tangibly embodied in an information carrier, such as one or more non-transitory machine-readable storage media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Components of different embodiments described herein may be combined to form other embodiments not specifically set forth above. Components may be left out of the circuitry shown in FIGS. 1 and 3 to 5 without adversely affecting its operation. Furthermore, various separate components may be combined into one or more individual components to perform the functions described herein.

In this regard, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single product or packaged into multiple products.

Other embodiments not specifically described herein are also within the scope of the following claims.

APPENDIX

| | |
|---|---|
| * Summary: | Executes a Remote Procedure Call. |
| *vi: | [Input] A handle to a Core Instrument. |
| * imageType: | [Input] The type of the image containing the target function. One of: |
| | TERHSI_IMAGE_RTAPP |
| | TERHSI_IMAGE_RTLIB |
| * custID: | [Input] The customer ID of the image containing the target function. |
| * appID: | [Input] The application ID of the image containing the target function. |

APPENDIX-continued

```
*
* funcID:       [Input] The function ID associated with the target function.
*               This value must be listed in the table returned by the
*               target image's FetchRpcInfo( ) implementation.
*
* timeout:      [Input] Maximum time (in seconds) to wait for the remote
*               function to complete. A negative value disables the timeout
*               timer.
*
* returnType:   [Input] The type of the target function's return value.
*               Specify NULL if the function has no return value or
*               one of:
*
*                   TERHSI_RPC_TYPE_INT8
*                   TERHSI_RPC_TYPE_INT16
*                   TERHSI_RPC_TYPE_INT32
*                   TERHSI_RPC_TYPE_INT64
*                   TERHSI_RPC_TYPE_REAL64
*
* returnedValue:[Output] The address of the variable that receives the
*               target function's return value. Specify NULL to ignore.
*
* ...:          [Input] A variable length argument list describing the
*               target function's parameters. Each parameter is listed in
*               order and the list is terminated with the value NULL.
*
*               Each parameter is identified as either an input, output, or
*               both and as an array or not using the following macros:
*
*                   TERHSI_RPC_PARAM_IN(type,param)
*                   TERHSI_RPC_PARAM_OUT(type,param)
*                   TERHSI_RPC_PARAM_INOUT(type,param)
*                   TERHSI_RPC_PARAM_INARRAY(count,type,param)
*                   TERHSI_RPC_PARAM_OUTARRAY(count,type,param)
*                   TERHSI_RPC_PARAM_INOUTARRAY(count,type,
*                   param)
*               In the above macros, 'param' identifies the value of the
*               parameter. For outputs and arrays, this value is interpreted
*               as an address specific to this process and is converted to
*               an appropriate address prior to delivery to the target
*               function.
*
*               In the above macros, 'type' may be a data structure record
*               handle or one of:
*
*                   TERHSI_RPC_TYPE_INT8
*                   TERHSI_RPC_TYPE_INT16
*                   TERHSI_RPC_TYPE_INT32
*                   TERHSI_RPC_TYPE_INT64
*                   TERHSI_RPC_TYPE_REAL64
*
*               In the above macros, 'count' identifies the number of
*               elements in the array. Note that 'count' is used by the RPC
*               logic and is not passed to the target function.
*
* <return>:     Possible return values:
*                   VI_SUCCESS
*                   TERHSI_ERROR_RPC_TARGET
*                   TERHSI_ERROR_PARAM
*/
ViStatus terHsi_RPC_Execute (ViSession vi,
                ViUInt32 imageType,
                ViUInt16 custID,
                ViUInt16 appID,
                ViUInt32 funcID,
                ViReal64 timeout,
                ViUInt32 returnType,
                ViAddr *returnedValue,
                ...);
```

What is claimed is:

1. A test system comprising:

a first computing device programmed to execute a test routine, the test routine being written to call a remote function;

a second computing device programmed to execute the remote function;

wherein the first computing device is programmed to perform operations (i) to collect parameter data for use by the remote function, and (ii) to pass information, including the parameter data, to the second computing device; and wherein the second computing device is programmed to perform operations (i) to build a stack based on the parameter data, (ii) to use the information to locate code for the function on the second computing device, (iii) to execute the code for the function on the second computing device, the function using the parameter data on the stack, (iv) to obtain output values from execution of the code for the function, and (v) to pass parameter data, including the output values, to the first computing device;

wherein at least some of the operations performed by the first computing device and the second computing device are implemented using a programming language that does not support type introspection.

2. The test system of claim 1, wherein passing the information from the first computing device and passing the parameter data from the second computing device are part of a marshaling convention; and wherein the first computing device and the second computing device are programmed to recreate the marshaling convention for subsequent calls to the remote function from the first computing device.

3. The test system of claim 1, wherein, on the second computing device, the following operations are implemented using a first computing language: (i) to build a stack based on the parameter data, and (iii) to execute the code for the function on the second computing device, and wherein, on the second computing device, the following operations are programmed using a second computing language: (iv) to obtain output values from execution of the code for the function, and (v) to pass parameter data, including the output values, to the first computing device.

4. The test system of claim 3, wherein the first computing language is Assembly language and the second computing language is the C computing language.

5. The test system of claim 3, wherein the second computing language does not support type introspection.

6. The test system of claim 1, wherein the information comprises a module identifier for identifying the second communication device and a function identifier for identifying the remote function, the module identifier and the function identifier being usable to obtain a physical address in which the code for the remote function is located.

7. The test system of claim 6, wherein using the information to locate code for the function on the second computing device comprises resolving the physical address using the module identifier and the function identifier, and retrieving the code for the function.

8. The test system of claim 1, wherein the first computing device is programmed to write data to registers on the second computing device; and wherein the second computing device is programmed to identify the data in the registers and to react to the data in the registers by locating the code for the function on the second computing device and by executing the code.

9. The test system of claim 1, wherein the first computing device is programmed to receive the parameter data, to identify locations where to store return values in the parameter data, and to store the return values in the locations.

10. The test system of claim 1, further comprising at least one PCI bus on a path between the first computing device and the second computing device.

11. The test system of claim 1, wherein collecting the parameter data comprises identifying, in a parameter list, one or more parameter types, one or more corresponding parameter values, and an end-of-list indicator.

12. The test system of claim 1, wherein the first computing device is a client device and wherein the second computing device is a server device.

13. A method performed on a test system, comprising:
on a first computing device, performing operations comprising: (i) collecting parameter data for use by a remote function, and (ii) passing information, including the parameter data, to the second computing device; and
on second computing device, performing operations comprising: (i) building a stack based on the parameter data, (ii) using the information to locate code for the function on the second computing device, (iii) executing the code for the function on the second computing device, the function using the parameter data on the stack, (iv) obtaining output values from execution of the code for the function, and (v) passing parameter data, including the output values, to the first computing device;
wherein at least some of the operations performed by the first computing device and the second computing device are implemented using a programming language that does not support type introspection.

14. The method of claim 13, wherein passing the information from the first computing device and passing the parameter data from the second computing device are part of a marshaling convention; and
wherein the first computing device and the second computing device recreate the marshaling convention for subsequent calls to the remote function from the first computing device.

15. The method of claim 14, wherein, on the second computing device, the following operations are programmed using a first computing language: (i) building a stack based on the parameter data, and (iii) executing the code for the function on the second computing device; and
wherein, on the second computing device, the following operations are programmed using a second computing language: (iv) obtaining output values from execution of the code for the function, and (vi) passing parameter data, including the output values, to the first computing device.

16. The method of claim 15, wherein the first computing language is Assembly language and the second computing language is the C computing language.

17. The method of claim 15, wherein the second computing language does not support type introspection.

18. The method of claim 13, wherein the information comprises a module identifier for identifying the second communication device and a function identifier for identifying the remote function, the module identifier and the function identifier being usable to obtain a physical address in which the code for the remove function is located.

19. The method of claim 18, wherein using the information to locate code for the function on the second computing device comprises resolving the physical address using the module identifier and the function identifier, and retrieving the code for the function.

20. The method of claim 13, wherein the first computing device writes data to registers on the second computing device; and
wherein the second computing device identifies the data in the registers and reacts to the data in the registers by locating the code for the function on the second computing device and by executing the code.

21. The method of claim 13, wherein the first computing device receives the parameter data, identifies locations where to store return values in the parameter data, and stores the return values in the locations.

22. The method of claim 13, further comprising at least one PCI bus on a path between the first computing device and the second computing device.

23. The method of claim 13, wherein collecting the parameter data comprises identifying, in a parameter list, one or more parameter types, one or more corresponding parameter values, and an end-of-list indicator.

24. The method of claim 13, wherein the first computing device is a client device and wherein the second computing device is a server device.

25. One or more non-transitory machine-readable media storing instructions that are executable to perform operations comprising:
on a first computing device performing operations comprising: (i) collecting parameter data for use by a remote function, and (ii) passing information, including the parameter data, to the second computing device; and
on second computing device performing operations comprising: (i) building a stack based on the parameter data, (ii) using the information to locate code for the function on the second computing device, (iii) executing the code for the function on the second computing device, the function using the parameter data on the stack, (iv) obtaining output values from execution of the code for function, (v) passing parameter data, including the output values, to the first computing device;
wherein at least some of the operations performed by the first computing device and the second computing device are implemented using a programming language that does not support type introspection.

* * * * *